United States Patent
Kindig et al.

(10) Patent No.: US 7,232,472 B2
(45) Date of Patent: Jun. 19, 2007

(54) METHOD FOR THE TREATMENT OF COAL

(75) Inventors: J. Kelly Kindig, Rapid City, SD (US); Robert R. Odle, Greenville, SC (US); Thomas E. Weyand, Beaver Falls, PA (US); Boyd R. Davis, Kingston (CA)

(73) Assignee: Alchemix Corporation, Carefree, AZ (US)

( * ) Notice: Subject to any disclaimer, the term of this patent is extended or adjusted under 35 U.S.C. 154(b) by 924 days.

(21) Appl. No.: 09/800,421

(22) Filed: Mar. 6, 2001

(65) Prior Publication Data

US 2002/0124466 A1   Sep. 12, 2002

(51) Int. Cl.
*C01B 3/32* (2006.01)

(52) U.S. Cl. ............... 48/127.5; 48/127.3; 48/197 R

(58) Field of Classification Search ............ 48/61, 48/99, 92, 119, 127.3, 127.5, 197 R
See application file for complete search history.

(56) References Cited

U.S. PATENT DOCUMENTS

| | | | |
|---|---|---|---|
| 1,345,905 A | 7/1920 | Abbott | |
| 3,031,287 A | 4/1962 | Benson et al. | 48/197 |
| 3,615,298 A * | 10/1971 | Benson | 48/197 R |
| 3,700,584 A | 10/1972 | Johanson et al. | 208/10 |
| 3,821,362 A | 6/1974 | Spacil | |
| 3,880,987 A | 4/1975 | Nahas | 423/657 |
| 3,971,639 A | 7/1976 | Matthews | 48/202 |
| 3,979,505 A | 9/1976 | Seitzer | 423/657 |
| 4,072,514 A | 2/1978 | Suzuki | 75/168 |
| 4,095,959 A | 6/1978 | Kunstle et al. | 48/73 |
| 4,126,668 A | 11/1978 | Erickson | 423/657 |
| 4,172,431 A * | 10/1979 | Tatem et al. | 122/5 |
| 4,216,199 A | 8/1980 | Erickson | 423/657 |
| 4,268,359 A * | 5/1981 | Rammler et al. | 201/31 |
| 4,310,503 A | 1/1982 | Erickson | 423/657 |
| 4,312,638 A | 1/1982 | Koump | 48/197 |
| 4,328,009 A | 5/1982 | Fischer et al. | 48/202 |
| 4,337,067 A * | 6/1982 | Jager et al. | 48/202 |

(Continued)

FOREIGN PATENT DOCUMENTS

JP   4318124   11/1992

(Continued)

OTHER PUBLICATIONS

Straus, J., et al.: Proceedings of the 1995 U.S. DOE Hydrogen Program Review, Apr. 18-21, 1995, Coral Gables, Florida, vol. 2, pp. 861-876. "$H_2$ from Biosyngas via Iron Reduction and Oxidation.".

Hydrogen From Coal Via Tin Redox: Energy Related Invention Program INV #3, By D. C. Erickson, Feb. 1981.

*Primary Examiner*—Basia Ridley
(74) *Attorney, Agent, or Firm*—Marsh Fischmann & Breyfogle LLP

(57) ABSTRACT

A method and apparatus for the treatment of coal to form a product gas such as methane ($CH_4$), and a high purity carbon product. The method includes contacting a coal-containing feedstock with a treatment gas that includes hydrogen. The coal feedstock can advantageously be a low-grade coal that contains high levels of impurities. The methane product gas can be augmented with hydrogen ($H_2$) gas. Reactants and by-products are advantageously recycled within the process system to enhance the economics of the process.

10 Claims, 8 Drawing Sheets

U.S. PATENT DOCUMENTS

| | | | |
|---|---|---|---|
| 4,343,624 A | 8/1982 | Belke et al. | 48/61 |
| 4,555,249 A | 11/1985 | Leas | 48/62 |
| 4,842,719 A | 6/1989 | MacArthur et al. | 208/421 |
| 4,942,734 A * | 7/1990 | Markbreiter et al. | 60/783 |

FOREIGN PATENT DOCUMENTS

| | | |
|---|---|---|
| JP | 6157003 A2 | 6/1994 |
| JP | 6-247702 | 9/1994 |

* cited by examiner

US 7,232,472 B2

METHOD FOR THE TREATMENT OF COAL

BACKGROUND OF THE INVENTION

1. Field of the Invention

The present invention relates to a method for the conversion of coal to recover energy value from the coal while minimizing waste by-products from the conversion process. The method can advantageously be utilized to convert very low-grade coal to products having high-energy value without emitting high levels of pollutants into the atmosphere.

2. Description of Related Art

Recently, the United States and other countries have experienced a shortage of natural gas and as a result, natural gas prices for consumers have increased substantially. Accordingly, there is a pressing need for economic methods for the manufacture of a high-value heating gas that can be used in place of natural gas. Natural gas has in composition that includes about 85 percent methane ($CH_4$), about 10 percent ethane ($C_2H_6$) and the balance including propane ($C_3H_8$), butane ($C_4H_{10}$) and nitrogen ($N_2$). Methane, the primary component of natural gas, has a heating value of about 51,623 Btu/lb.

In addition to being supplied directly to consumers, natural gas and other high BTU gas compositions can be utilized on-site to produce electricity. Further, there are many natural resources that are utilized to produce energy in addition to natural gas. For example, coal can be burned in conventional boilers to generate steam, which can be used to generate electricity. Many regions such as the United States, China and India possess vast reserves of coal that are not presently being exploited for current energy demands due to the high economic and ecological costs related to the use of the low-grade coal. Further, some of the coal deposits, particularly those found in India, contain high levels of contaminates and must be subjected to expensive processing prior to utilization. Alternatively, the off-gas from the boiler must be scrubbed to remove pollutants.

It is known to treat coal in a gasification process to convert the coal to a useful hydrocarbon product. For example, U.S. Pat. No. 3,700,584 Johanson et. al. is directed to the hydrogenation of low rank coal having a high oxygen content.

The prior art is generally directed to the direct conversion of the carbon in the coal to a hydrocarbon product, such as methane gas. Such processes have not proved to be economically and ecologically viable means for extracting energy value from coal.

SUMMARY OF THE INVENTION

One aspect of the present invention is directed to a method for the conversion of a coal-containing feedstock to a gas product including methane. The method includes the steps of contacting the coal feedstock with a treatment gas including hydrogen, such as at least about 40 weight percent hydrogen, at a reaction temperature and for a reaction time sufficient to convert at least about 90 percent of the volatile matter in the coal-containing feedstock to methane and form a purified carbon product.

According to another aspect of the present invention, a method for the treatment of a coal-containing feedstock is provided. The method includes forming a $H_2/CO$ treatment gas by the partial oxidation of carbon and contacting the treatment gas with a coal feedstock to convert at least about 90 percent of the volatile matter in the coal-containing feedstock to methane. A purified carbon product can be recovered from the contacting step and recycled to produce the treatment gas.

According to another aspect of the present invention, a method for the treatment of coal is provided. The method includes the steps of forming a treatment gas by the partial oxidation of carbon and contacting the treatment gas with a coal feedstock at a reaction temperature and for reaction time sufficient to remove at least about 95 percent of the volatile matter in the coal-containing feedstock. The purified carbon product formed in the contacting step may be combusted in a conventional boiler.

DESCRIPTION OF THE INVENTION

Figure 1:
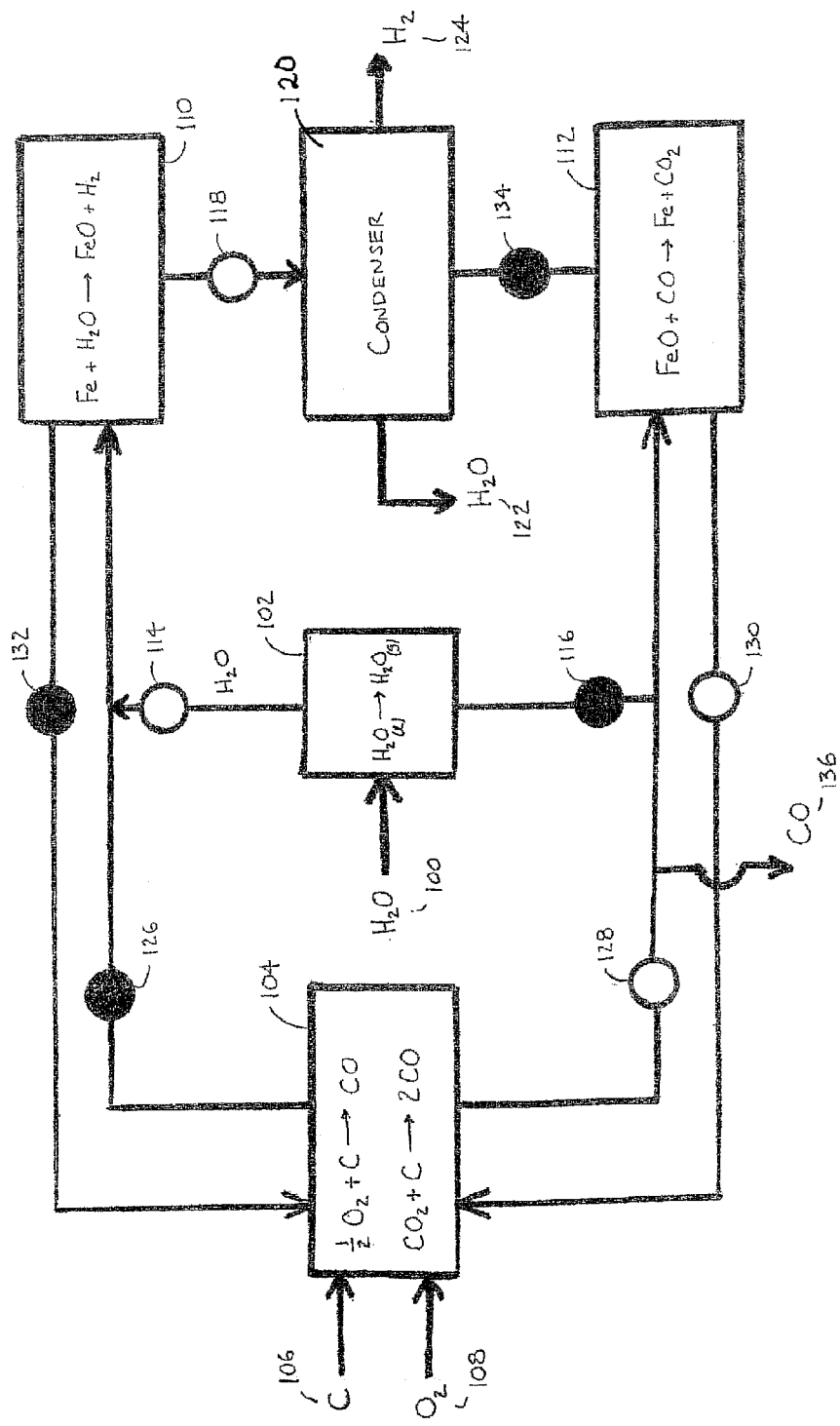
FIG. 1 illustrates a method for producing hydrogen gas for the treatment of coal according to an embodiment of the present invention.

The present invention is directed to the treatment of coal to produce energy value from the coal while minimizing the discharge into the atmosphere of harmful by-products that are typically associated with the conversion of coal to energy. The method enables the extraction of the available energy content from the coal in the form of high Btu gas while reducing the atmospheric discharge of harmful by-products.

Coal exists in relative abundance in the United States and many other regions, including third-world regions with under-developed energy production infrastructure. One of the problems associated with the use of coal is that the coal must typically be cleaned or purged of its mineral matter content, including sulfur; notwithstanding, there usually is an additional need for post-combustion gas scrubbing to meet environmental standards.

It is an advantage of the present invention that the coal feedstock can include low-grade coal including high-sulfur coal and other low-grade coals. Such low-grade coals are readily available and are available at low cost. As used herein, the term low-grade coal refers to coal having a sulfur content in excess of 2 weight percent and an ash content in excess of about 10 weight percent.

Generally, the method of the present invention includes providing the coal feedstock to a hydrogenation unit and contacting the coal feedstock with a treatment gas that includes $H_2$. The hydrocarbons in the coal that are volatile will methanate to form $CH_4$. When the treatment gas also includes carbon monoxide (CO), the CO travels through the hydrogenation unit substantially unaffected. The exit gases from the hydrogenation unit ($CH_4$, CO and acid gases) are scrubbed to produce a clean, high Btu gas product. A portion of this gas product can be burned in a combined cycle generator taking advantage of the generator's high thermal-to-electric conversion efficiency. Another portion of the gas product can be combusted in a conventional boiler with the non-volatile carbon that is formed in the hydrogenation unit. The carbon will be essentially free of sulfur because the hydrogen treatment gas is a strong desulfurizing agent. In one embodiment, another portion of the carbon that is produced in the hydrogenation unit can be recycled back to the production of a $H_2$/CO treatment gas.

One of the important aspects of the method according to the present invention is the in-situ manufacture of large quantities of $H_2$ at a relatively low cost. It is believed that one of the primary hindrances to the methods disclosed in the prior art for the treatment of coal is the need for high volumes of hydrogen gas and the high cost associated with the hydrogen gas. According to the present invention, high volumes of hydrogen gas can be economically generated in-situ.

Preferably, a hydrogen gas stream is produced by the reduction of steam ($H_2O$) with a metal, thereby forming hydrogen gas ($H_2$) and a metal oxide (MeO). In a particularly preferred embodiment, a metal oxide is simultaneously reduced in a separate reactor to form a metal (Me) that can subsequently be used for the steam reduction.

Figure 2:
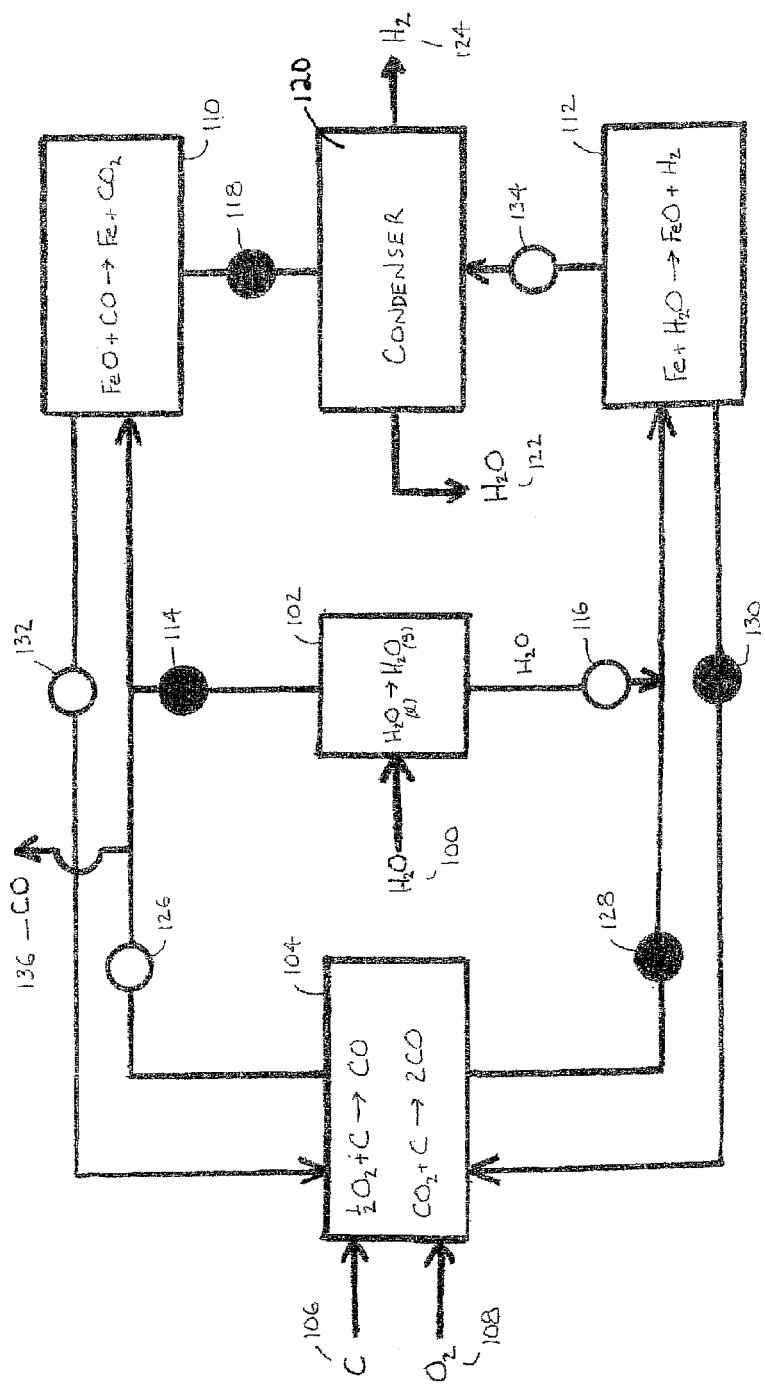
FIG. 2 illustrates a method for producing hydrogen gas for the treatment of coal according an embodiment of the present invention.

Referring now to the Figures, the present invention will be described in detail. FIGS. 1 and 2 illustrate one embodiment of the method of the present invention using iron and iron oxide to generate hydrogen gas for subsequent hydrogenation of a coal feedstock. FIGS. 1 and 2 illustrate the same apparatus with alternating flow of gaseous reactants and products to continuously form both iron and iron oxide reaction products for the process. Although this embodiment of the present invention is described with respect to oxidation/reduction reactions involving iron metal, it may be desirable to utilize metal alloys such as Fe/Ni or Fe/Cr.

As is illustrated in FIG. 1, steam (gaseous $H_2O$) is generated from water 100 in a reactor 102, such as a conventional boiler. The steam preferably exits the steam reactor 102 and is conveyed directly to a first reactor 110 through valve 114. The temperature of the steam can be adjusted to control the temperature in the first reactor 110.

A reducing gas, preferably a reducing gas that includes carbon monoxide (CO), is generated in a reduction gas reactor 104. In the embodiment illustrated in FIG. 1, supplying carbon 106 and oxygen 108 to the reactor 104 initially generates CO from carbon and oxygen ($O_2$). As the reaction progresses, the CO is produced from $CO_2$ by the Boudouard reaction:

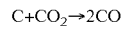

$$C+CO_2 \rightarrow 2CO$$

The source of the carbon 106 can be, for example, coal, oil, biomass or a similar carbonaceous material. The reducing gas exiting reactor 104 is preferably at least about 90 weight percent CO and more preferably is at least about 95 weight percent CO.

The steam and the reducing gas are then supplied to first and second reactors 110 and 112. The first and second reactors 110 and 112 can be adapted to hold molten metal or molten metal oxide through which reactant gases are passed or the reactors can be fluidized bed reactors adapted to contact the gases with particulate metal and metal oxide in a fluidized state. For the use of iron and iron oxide, the first reactor 110 and second reactor 112 are preferably fluidized beds.

The steam reactor 102 has associated valves 114 and 116 that can be switched to provide the steam to either the first reactor 110 or the second reactor 112. In the embodiment illustrated in FIG. 1, the valve 114 is open to provide steam to the first reactor 110. The first reactor is initially provided with iron, preferably in particulate form. In the first reactor 110 the steam reacts with the iron to form iron oxide, preferably FeO, and hydrogen gas, in accordance with the reaction:

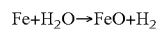

$$Fe+H_2O \rightarrow FeO+H_2$$

In order to maximize hydrogen production, it is preferable to feed a stoichiometric excess of $H_2O$ to the first reactor 110. Hydrogen gas and the water vapor are removed through a valve 118 to a condenser 120 where water 122 is removed from the gas stream and pure hydrogen gas 124 is recovered.

Simultaneously, the reduction gas reactor 104 produces CO reducing gas. The valves 126 and 128 are controlled to provide the reducing gas composition to the appropriate reactor. In the embodiment illustrated in FIG. 1, the valve 128 is opened to supply reducing gas to the second reactor 112. Excess CO 136 is preferably removed to remove oxygen from the system corresponding to the amount of hydrogen being removed from the system. This excess CO 136 can be used as process heat, such as to heat the boiler 102, advantageously conserving heat value in the process and maximizing the use of unreacted CO.

In the second reactor 112, iron oxide is initially provided and the reducing gas composition is reacted with the iron oxide to form iron and carbon dioxide, in accordance with the reaction:

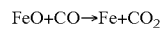

$$FeO+CO \rightarrow Fe+CO_2$$

The iron oxide is preferably in fluidized particulate form to enable the rapid and economical formation of the iron. Advantageously, the carbon dioxide can be recycled back to the reactor 104 through valve 130 for the production of additional reducing gas. In one embodiment, sufficient $CO_2$ is recycled back to the reactor 104 such that the amount of fresh oxygen 108 supplied to reducing gas reactor 104 is only enough to maintain the desired reaction temperature. Preferably, the reaction temperature in the reduction gas reactor 104 is from about 800° C. to about 1300° C.

FIG. 2 illustrates the identical apparatus as is illustrated in FIG. 1. However, in FIG. 2, the valves 114, 116, 118, 126, 128, 130, 132 and 134 are switched so that the first reactor 110 is the metal reduction reactor and the second reactor 112 is the steam reduction reactor. Hydrogen gas is therefore extracted from the second reactor 112 through valve 134.

In accordance with the foregoing, it is apparent that the first and second reactors 110 and 112, at any given point in time during the process, will include some mixture of iron and iron oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction of steam or the reduction of iron oxide. Therefore, no heating, cooling and reheating of the non-gaseous reactants is necessary. In a preferred embodiment, the reaction temperature of the first and second reactors is maintained at not greater than about 1000° C., such as from about 700° C. to about 900° C.

It is also an advantage of the present invention that the non-gaseous reactants (e.g., the iron and the iron oxide) are not physically moved from one location to another, such as from one reactor or reactor zone to another. On a commercially useful scale, the amount of iron and/or iron oxide in each reactor can be several hundred tons. Eliminating the need to move such a large mass of material substantially reduces the cost associated with producing the hydrogen gas. It will be appreciated that it may be desirable to supplement the iron and/or iron oxide with fresh feed due to any inherent system losses, although such supplementation should be minimal.

Other metal/metal oxide systems can be used for the production of hydrogen gas and subsequent hydrogenation of a coal feedstock according to the present invention. In one particularly preferred embodiment, tin (Sn) and tin oxide ($SnO_2$) are used to form hydrogen gas.

Figure 3:
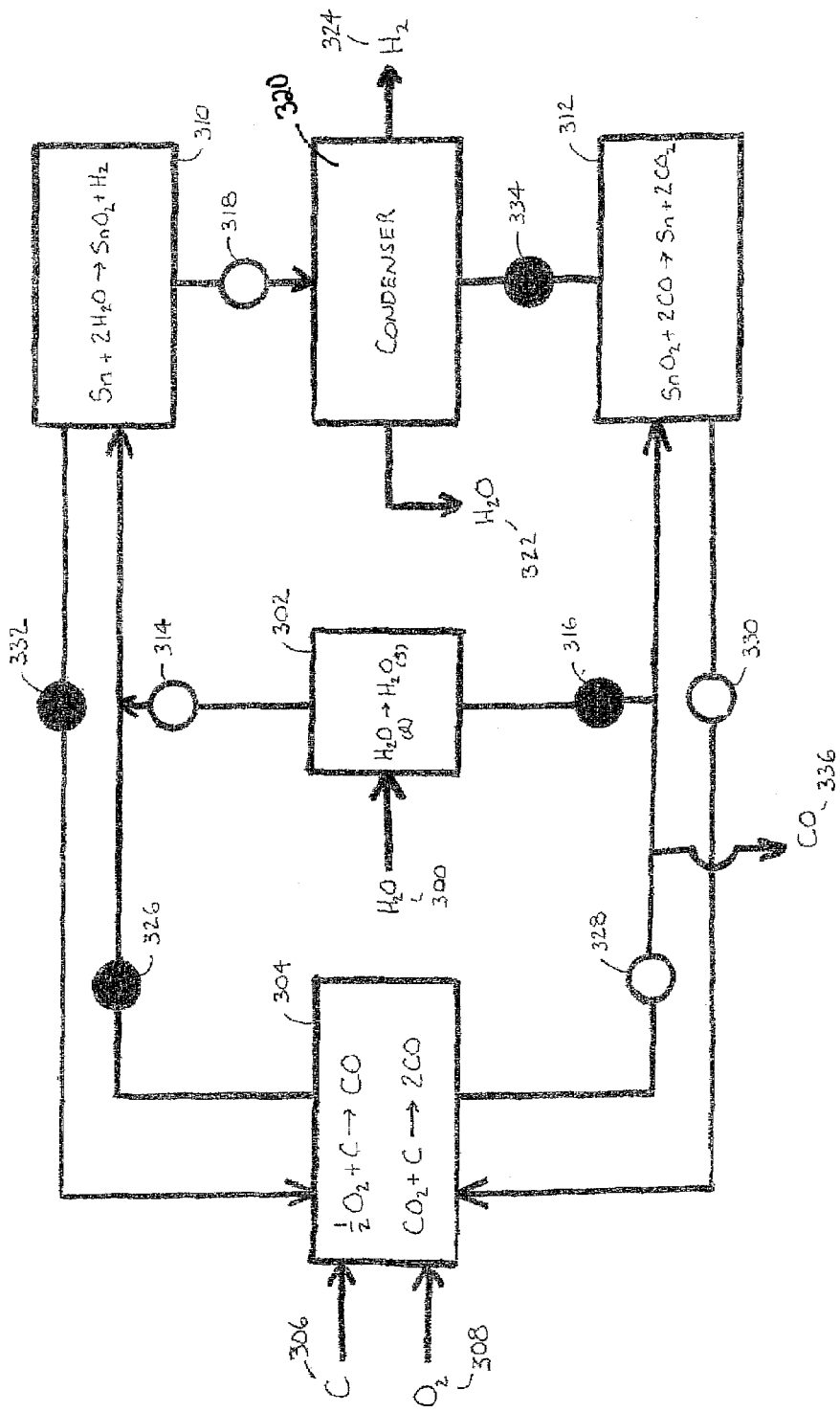
FIG. 3 illustrates a method for producing hydrogen gas for the treatment of coal according to an embodiment of the present invention.
Figure 4:
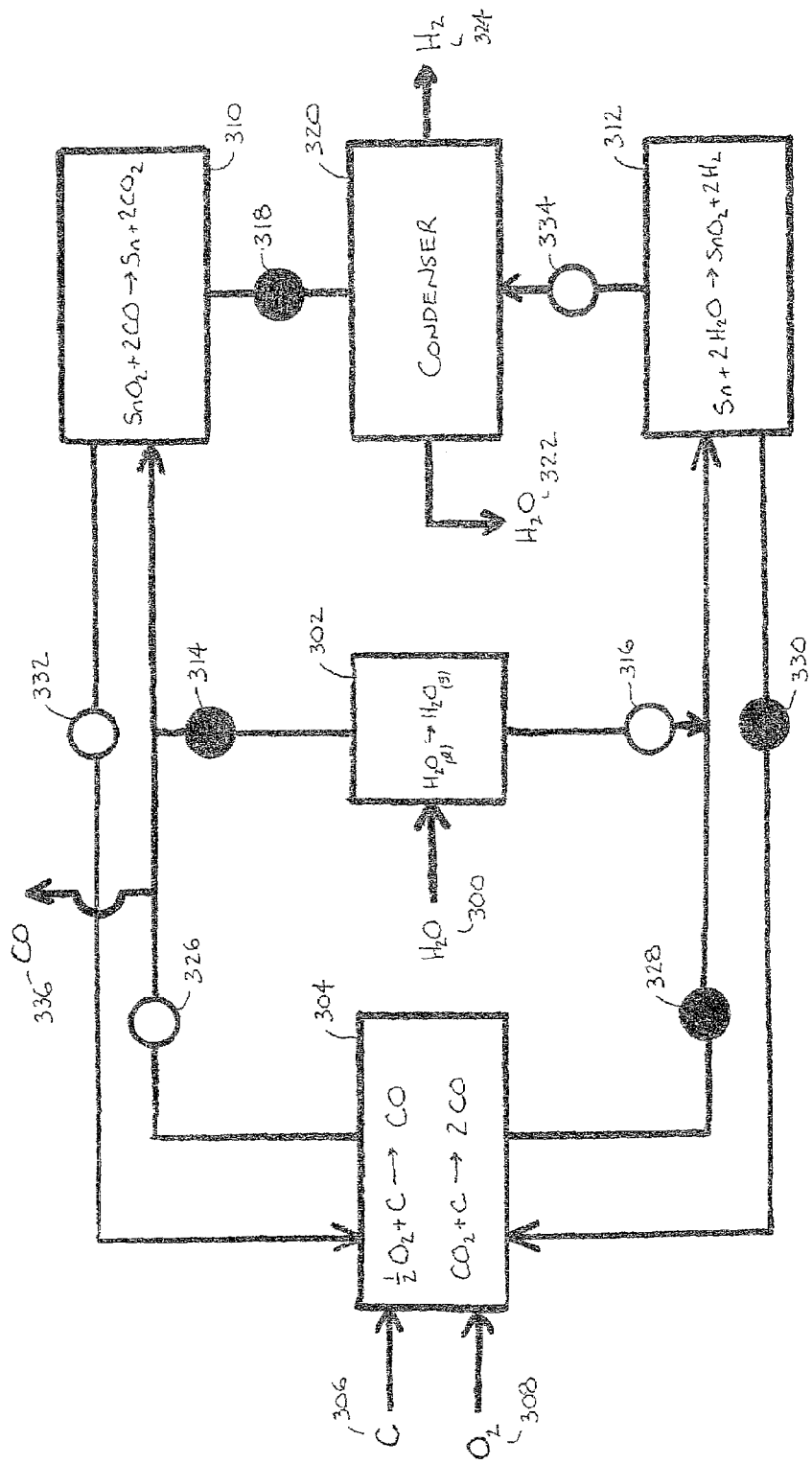
FIG. 4 illustrates a method for producing hydrogen gas for the treatment of coal according an embodiment of the present invention.

FIGS. 3 and 4 illustrate an embodiment of the method of the present invention wherein hydrogen is formed using tin (Sn) and tin oxide ($SnO_2$). Similar to FIGS. 1 and 2, FIGS. 3 and 4 illustrate the same apparatus with alternating flow of gaseous reactants and products to continuously form both metal and metal oxide reaction products.

As is illustrated in FIG. 3, steam is generated from water 300 in a steam reactor 302, such as a conventional boiler. The steam exits the steam reactor and is conveyed to the first reactor 310 through valve 314. The temperature of the steam can be used to partially control the reaction temperature in the first reactor 310.

A reducing gas, preferably a reducing gas that includes carbon monoxide (CO), is generated in a reactor 304. In the embodiment illustrated in FIG. 3, supplying carbon 306 and oxygen 308 to the reactor initially generates CO from carbon and oxygen ($O_2$). As the reaction progresses, the CO is produced from $CO_2$ by the Boudouard reaction. The source of the carbon 306 can be, for example, coal or a similar carbonaceous material. The reducing gas exiting the reactor 304 is preferably at least about 90 weight percent CO and more preferably is at least about 95 weight percent CO.

The steam and the reducing gas are then supplied to first and second reactors 310 and 312. The steam is preferably reacted with molten tin metal by passing the gaseous steam through a pool of the molten tin metal. The molten tin metal will oxidize, forming $SnO_2$ particulates dispersed in the molten Sn metal.

Therefore, the first reactor 310 and second reactor 312 are preferably large reactors adapted to heat and contain molten tin and a mixture (slurry) of molten tin with tin oxide. The steam reactor 302 has associated valves 314 and 316 that can be switched to provide the steam to either the first reactor 310 or the second reactor 312. In the embodiment illustrated in FIG. 3, the valve 314 is open to provide steam to the first reactor 310. The first reactor 310 is initially provided with a pool of molten tin having a temperature of at least about 232° C. (the melting point of tin) and preferably from about 600° C. to about 800° C. In the first reactor 310 the steam reacts with the molten tin to form $SnO_2$ and hydrogen gas, in accordance with the reaction:

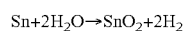

$$Sn + 2H_2O \rightarrow SnO_2 + 2H_2$$

To maximize hydrogen production, it is preferable to feed a stoichiometric excess of $H_2O$ to the first reactor 310. Hydrogen gas and the excess water vapor are removed through a valve 318 to a condenser 320 where water 322 is removed from the gas stream and pure hydrogen gas 324 is recovered.

Simultaneously, the reduction gas reactor 304 produces CO reducing gas by the Boudouard reaction. The valves 326 and 328 are controlled to provide the reducing gas composition to the appropriate reactor. In the embodiment illustrated in FIG. 3, the valve 328 is opened to supply reducing gas to the second reactor 312. Excess CO 336 is preferably removed to remove oxygen from the system corresponding to the amount of hydrogen being removed from the system. This excess CO 336 can be used as process heat, such as to heat the boiler 302. In the second reactor 312, tin oxide is initially provided and the reducing gas composition is reacted with the tin oxide to form molten tin metal and carbon dioxide, in accordance with the reaction:

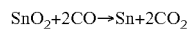

$$SnO_2 + 2CO \rightarrow Sn + 2CO_2$$

The tin oxide is preferably in particulate form to enable the rapid and economical reduction of the tin oxide to tin metal. The tin oxide can initially be provided as a slurry of the oxide in molten tin metal. Advantageously, the carbon dioxide can be recycled back to the reactor 304 through valve 328 for the production of additional reducing gas. In one embodiment, sufficient $CO_2$ is recycled back to the reactor 304 such that the amount of fresh oxygen 308 supplied to Boudouard reactor 304 is only enough to maintain the desired reaction temperature, which is preferably from about 800° C. to about 1300° C. This also maximizes the use of unreacted CO.

FIG. 4 illustrates the identical apparatus as is illustrated in FIG. 3. However, in FIG. 4, the valves 314, 316, 318, 326, 328, 330, 332 and 334 are switched so that the first reactor 310 is the metal reduction reactor and the second reactor 312 is the steam reduction reactor. Hydrogen gas is therefore extracted from the second reactor 312 through valve 334.

It is apparent that the reactors 310 and 312, at any given point in time during the process, will include some mixture of tin and tin oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction or the oxidation of the tin/tin oxide. Therefore, no heating, cooling and reheating of the non-gaseous reactants is necessary. In a preferred embodiment for the production of hydrogen from $Sn/SnO_2$, the reaction temperature of the first and second reactors is maintained at a temperature of at least about 232° C. and not greater than about 1120° C. (the melting point of $SnO_2$), such as from about 400° C. to about 800° C. Lower reaction temperatures are preferred to minimize large $SnO_2$ particles whereas higher temperatures increase reaction kinetics.

As with the iron/iron oxide system described hereinabove, it is also an advantage of the present invention that the non-gaseous reactants (i.e., the molten tin and the tin oxide) are not physically moved from one location to another, such as from one reactor or reactor zone to another. On a commercially useful scale, the amount of molten tin and/or tin oxide in each reactor can be several hundred tons. By eliminating the need to move such a large mass of material, the cost associated with producing the hydrogen gas is substantially reduced. It will be appreciated that it may be desirable to supplement the tin and/or tin oxide with fresh feed due to any inherent system losses, although such supplementation should be minimal.

The hydrogen gas stream that is produced according to the foregoing method has a high purity and preferably includes greater than about 99 weight percent hydrogen and more preferably greater than about 99.9 weight percent hydrogen after removal of residual water in the condenser. It is an advantage of this embodiment of the invention that the hydrogen gas does not require separation from another gas species such as carbon monoxide (CO).

The substantially pure hydrogen gas stream that has been formed by the reduction of steam can then be used as the treatment gas for the treatment of coal in accordance with the present invention. The integration of the foregoing method and apparatus with a coal treatment method and apparatus will be more clearly understood with reference to FIGS. 5 and 6

Figure 5:
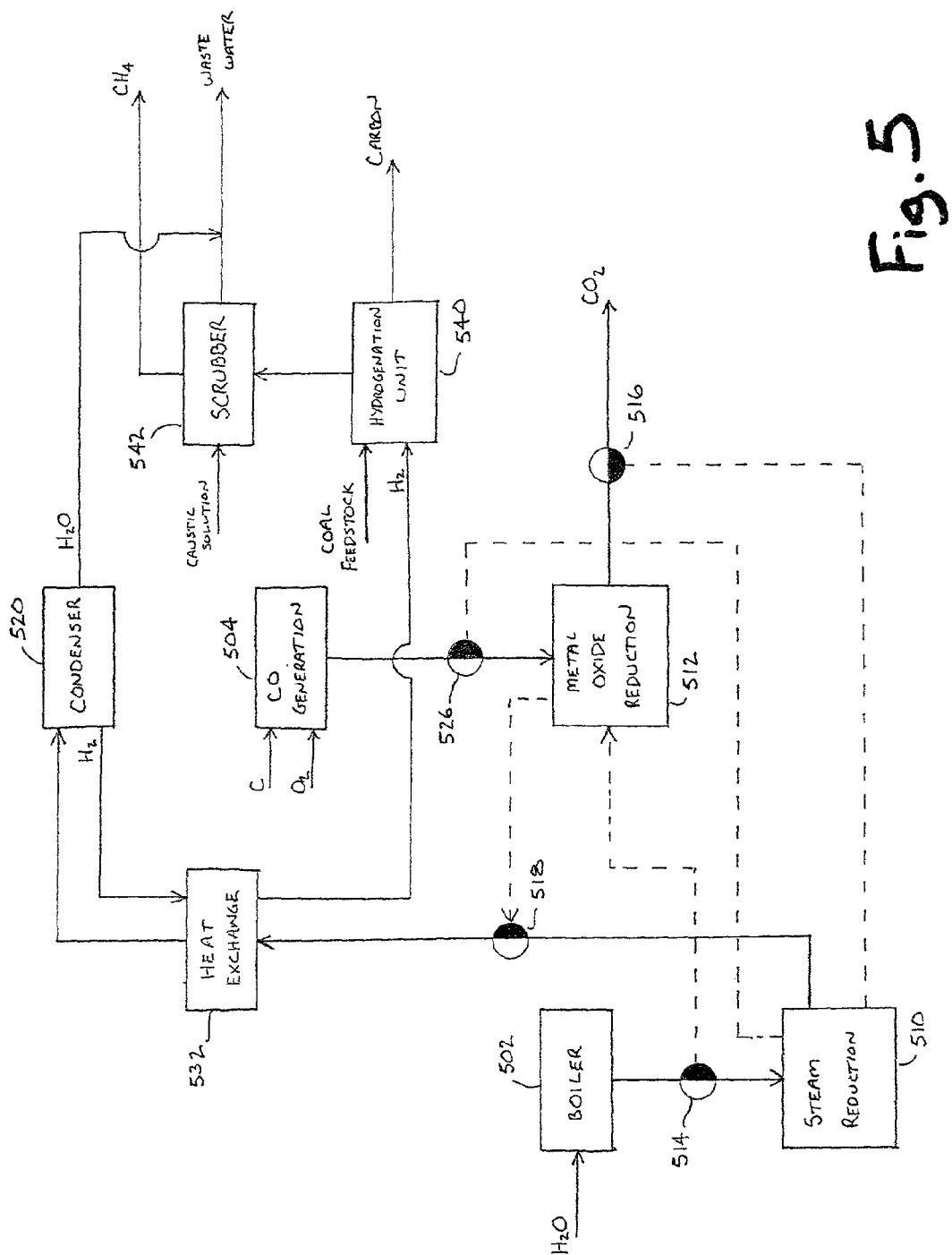
FIG. 5 illustrates a method for the treatment of coal using hydrogen gas according to an embodiment of the present invention.

Referring to FIG. 5, water is heated in a boiler 502 to produce steam. The path of the gaseous steam is controlled by valve 514 and is directed to a reactor 510 where a metal (e.g., tin) is oxidized to a metal oxide (e.g., tin oxide), thereby forming hydrogen gas in accordance with the method described with respect to FIGS. 1-4. The hydrogen gas stream is routed through valve 518 and includes some excess water that can be removed in a condenser 520. A heat exchange device 532 can be utilized to extract heat value from the hydrogen and steam gas stream and the extracted heat can be used as process heat, such as to heat the boiler 502.

Simultaneously, carbon and oxygen are supplied to a reactor 504 where CO is generated and supplied to reactor 512 through valve 526. In the reactor 512, the metal oxide is reduced to the metal by reacting the metal oxide with the CO. It will be appreciated with reference to FIGS. 1-4 that $CO_2$ exiting the reactor 512 through valve 516 can be routed to the reactor 504 to generate CO.

The hydrogen-containing gas stream is conveyed to a hydrogenation unit 540 where the hydrogen gas is contacted with the coal feedstock. The hydrogenation unit 540 can be a fluidized bed reactor or other reactor that is suitable for the treatment of particulate coal. The unit is preferably operated at ambient or near ambient pressure, such as a pressure of not greater than about 5 psi. It is an advantage of the present invention that the hydrogenation unit 540 is not operated at a substantial elevated pressure in order to treat the coal and produce substantial quantities of methane-containing product gas.

The reaction in the hydrogenation unit 540 is preferably carried out at a temperature of at least about 700° C. and preferably not greater than about 1100° C., such as from about 800° C. to about 900° C. The reaction that occurs in the hydrogenation unit is exothermic and therefore the need for the addition of external heat is minimal.

Figure 6:
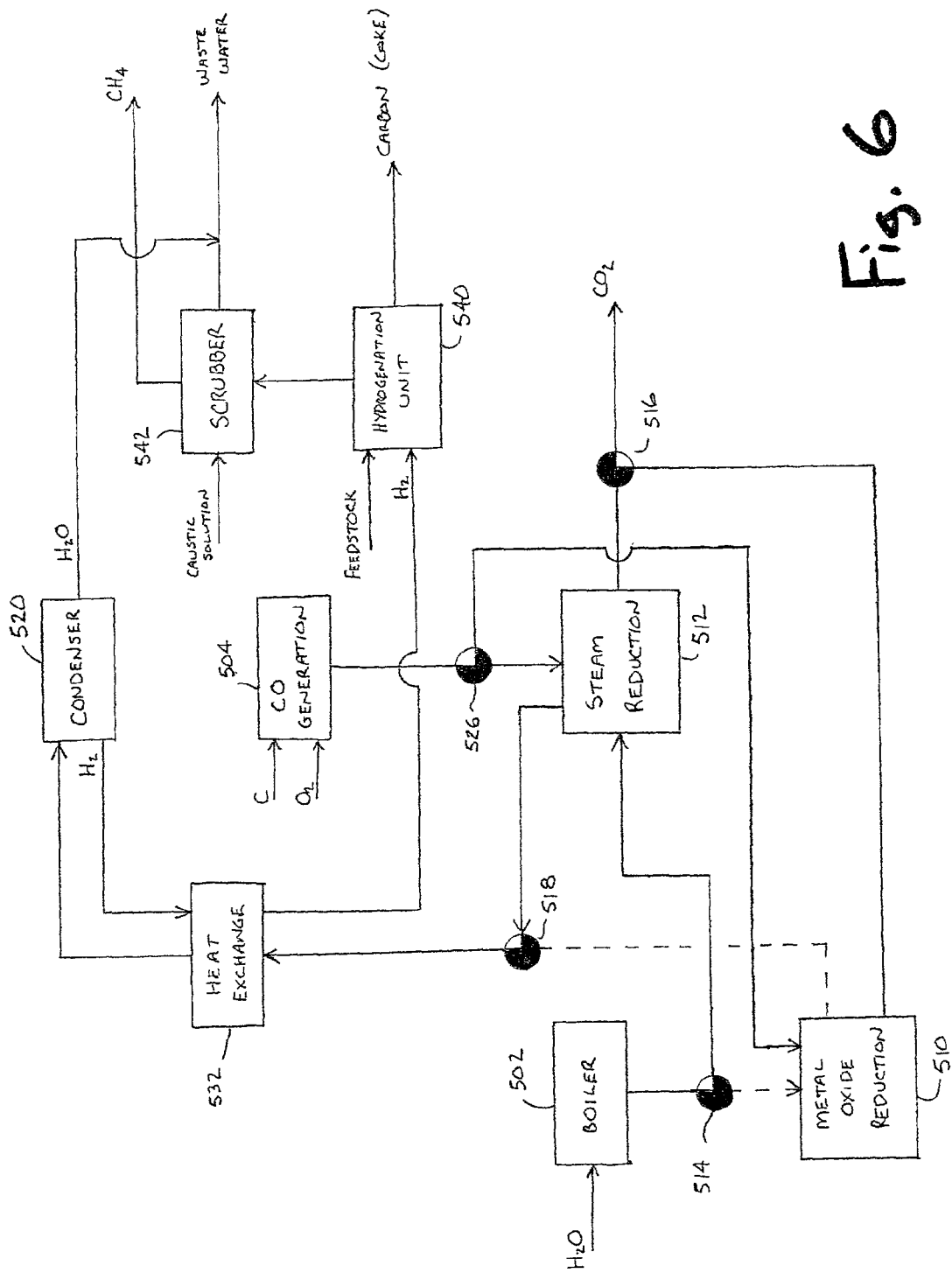
FIG. 6 illustrates a method for the treatment of coal using hydrogen gas according to an embodiment of the present invention.

Referring to FIG. 6, the same apparatus as in FIG. 5 is illustrated wherein the valves 514, 516, 518 and 526 are switched such that a hydrogen gas stream is produced by steam oxidation of iron in the reactor 512 and is routed to the hydrogenation unit 540. Thus, a substantially constant high volume flow of hydrogen gas can be supplied to hydrogenate the incoming coal feedstock.

Coal is a complex mixture of chemical compounds that are primarily organic compounds. While coal is predominately a hydrocarbon, impurities such as sulfur and nitrogen are trapped in the coal. These impurities lead to the formation of sulfuric acid and nitric acid if released into atmosphere and must be scrubbed from the off-gas in a typical coal-based power plant. Further, when the coal is burned, the carbon combines with oxygen in the atmosphere and forms $CO_2$, a well-known greenhouse gas that traps the earth's heat.

According to the present invention, when the coal feedstock is treated in the hydrogenation unit 540 with the hydrogen treatment gas, the coal is not burned. Rather, it is heated to remove the volatile components in the coal. These volatile components advantageously form a high Btu product gas containing methane. The residue from the removal of the volatiles is purified by the action of the hydrogen, including removal of sulfur and nitrogen, and the resulting purified carbon (i.e., coke) can be combusted in a conventional boiler with methane and without the formation of detrimental by-products.

The methane-containing gas stream that is produced by the hydrogenation reaction can be treated in a scrubber 542 to remove contaminants from the gas stream. For example, the scrubber can apply a caustic solution to form a benign waste stream including, for example, chloride compounds. Sulfur in the coal will form hydrogen sulfide ($H_2S$) that can be scrubbed from the methane gas stream. It is advantageous to scrub the methane gas stream prior to combustion, since combustion creates a higher volume gas stream.

The methane gas can be combusted on-site to generate electricity, or can be treated to remove CO (if any) and provided to end-users as a pipeline gas. Further, a portion of the $CH_4$ can be cycled back to the other unit operations to provide process heat. For example, a portion of the $CH_4$ can be diverted to the reactors 510 and 512 and/or can be used to power the boiler 502.

The hydrogenation treatment advantageously removes the impurities in the coal. The treated carbon exiting the hydrogenation unit will be a clean coke product that includes some ash and preferably includes not greater than about 0.1 weight percent sulfur.

According to one embodiment of the present invention, a portion of the coke can be cycled back to the reactor 504 for the production of CO. In the reactor 504 the carbon will be converted to CO and the ash can be easily removed. The remaining coke from the hydrogenation unit 540 can be burned in a conventional boiler with methane for additional energy production. Due to the purity of the incoming treated carbon, the ash by-product from the boiler advantageously has a low carbon content and is a valuable commodity. For example, the ash can be readily used as a filler in cementitious compositions.

Further, a portion of the $H_2$ gas that is produced by the reduction of steam can be diverted from the hydrogenation unit 540 and used directly as a fuel source, either alone or in combination with the methane gas. For example, the hydrogen can be directly fired in a boiler.

The treatment of coal according to an alternative embodiment of the present invention can be carried out using a treatment gas that includes both hydrogen and carbon monoxide (CO).

Figure 7:
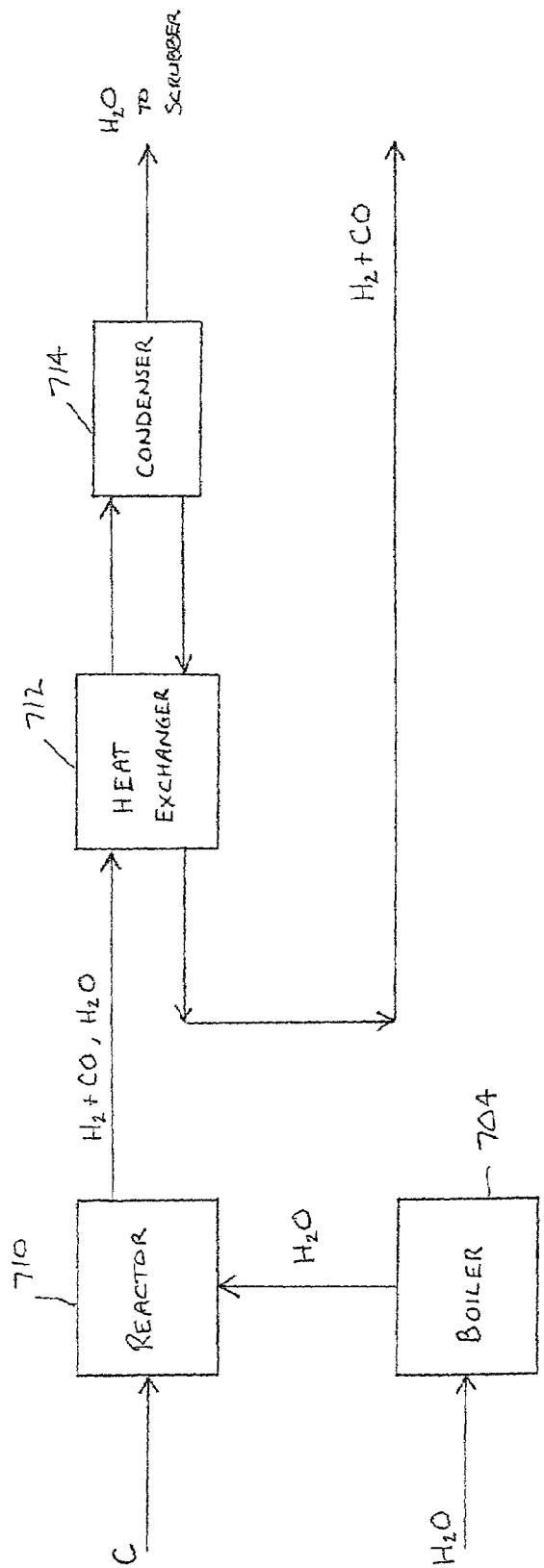
FIG. 7 illustrates a method for producing a hydrogen-containing gas stream for the treatment of coal according to an embodiment of the present invention.

A flowsheet illustrating the means for generating a $H_2$/CO gas stream by partial oxidation of carbon is illustrated in FIG. 7. Water is provided to a boiler 704 to generate steam. The steam is combined with carbon in a reactor 710 at an elevated temperature, such as from about 900° C. to about 1300° C., to form $H_2$ and CO which exits the reactor 710 with excess $H_2O$. This gas stream can be passed through a heat exchanger 712 to conserve process heat and then through a condenser 714 to remove the excess water. The dried gas stream, which is a mixture of $H_2$ and CO in a 1:1 molar ratio, can then be used as a treatment gas in a hydrogenation unit.

Figure 8:
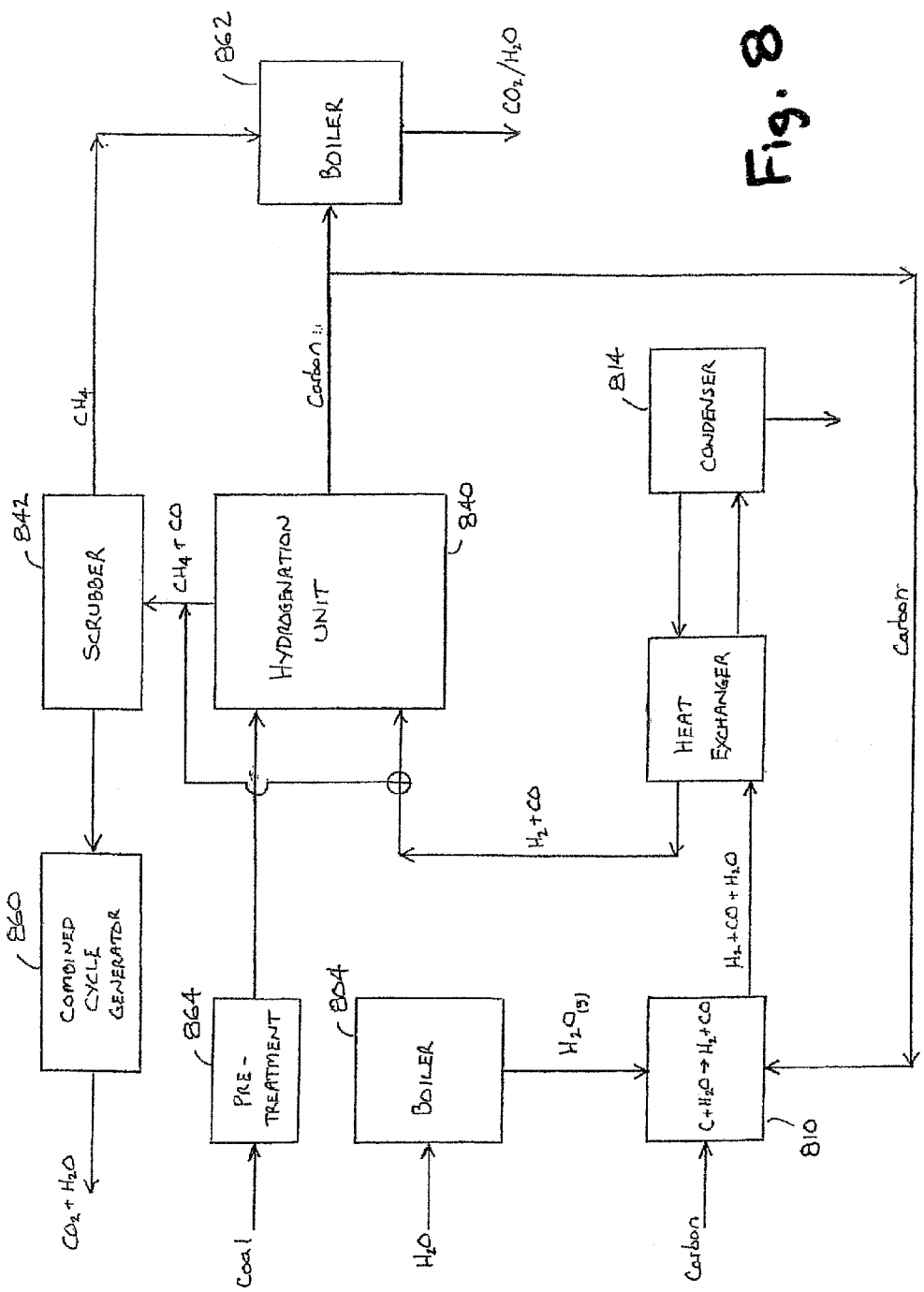
FIG. 8 illustrates a method for the treatment of coal with a hydrogen-containing gas according to an embodiment of the present invention.

Referring to FIG. 8, a reduction gas stream is provided including $H_2$ and CO, such as from the partial oxidation of carbon illustrated in FIG. 7. Specifically, water is heated in a boiler 804 to form steam, which is contacted with carbon in reactor 810 to form $H_2$ and CO. After removal of excess water in a condenser 814, the treatment gas is provided directly to the hydrogenation unit 840. Simultaneously, a coal feedstock is provided to the hydrogenation unit 840 to be reacted with the treatment gas. The coal feedstock can optionally be subjected to pre-treatment, such as to comminute the coal to a maximum particle size of about 1 mm. Preferably, the reaction takes place at a temperature of at least about 600° C. and not greater than about 1100° C., such as from about 700° C. to about 900° C.

The CO essentially passes through the hydrogenation unit 840 without reacting with the feedstock. The hydrogen reacts with the hydrocarbon species in the coal to form methane. The methane gas stream can be scrubbed in scrubber 842 to remove contaminants, as is discussed above with respect to FIGS. 5 and 6.

In the embodiment illustrated in FIG. 8, the resulting scrubbed product gas stream is split to provide power generation in a generator 860 and to cycle a portion of the methane-containing product gas to a conventional boiler 862 to generate process heat and/or additional electricity. Preferably, a portion of the scrubbed product gas stream is combined in the boiler 862 with the purified carbon product. Due to the use of very clean carbon and methane gas, the boiler can operate at sufficiently low temperatures to preclude formation of nitrogen oxides while maintaining high conversion efficiencies of the carbon.

It should also be noted with respect to FIG. 8 that a portion of the $H_2$/CO treatment gas can be diverted prior to the hydrogenation unit 840 and mixed with the methane-containing gas.

The generator 860 can advantageously be a combined cycle generator. In a combined cycle generator, exhaust heat from a first system, referred to as the top cycle, is used to generate power in a second system, referred to as the bottom cycle. Such combined cycle systems typically employ a combustion turbine in the top cycle, and a steam turbine in the bottom cycle. A heat recovery steam generator uses the hot exhaust gas from the combustion turbine to produce steam that drives one or more steam turbines that can be used to generate electricity. Combined cycle generators can operate with up to about 55 percent efficiency, whereas traditional boilers operate at only about 37 percent efficiency.

As is discussed above, the primary feedstock to the hydrogenation unit of the present invention can be a low-grade coal as well as a high-grade coal. Indeed, low-grade coal feedstock can be advantageous since they are generally available at a low cost. In one embodiment, the coal feedstock is a low grade coal having at least 1 weight percent sulfur, such as at least about 2 weight percent sulfur. The coal can be pre-treated in a pre-treatment unit 864 such as to comminute the coal and remove surface moisture. For example, it is desirable to comminute the coal to reduce the maximum particle size to not greater than about 1 mm. When the feedstock is comminuted coal, the hydrogenation process results in a highly purified and finely divided carbon product.

The hydrogenation treatment according to the present invention converts the volatiles (e.g., hydrocarbons) in the coal to methane. Preferably, at least about 90 weight percent, more preferably at least about 95 weight percent and even more preferably at least about 99 weight percent of the volatile matter is converted to methane.

As is discussed above, the coal frequently includes contaminants, including high levels of sulfur. The method of the present invention advantageously takes advantage of the fuel value of the volatile matter and simultaneously strips the contaminants from the coke. The sulfur will react with the hydrogen gas and form hydrogen sulfide, which can be easily removed from the waste stream.

Further, the method of the present invention enables the production of energy from the coal feedstock while producing significantly less carbon dioxide per kilowatt-hour of energy produced than is typically produced in a conventional coal-fired power plant. The reduction in carbon dioxide emission is an important environmental factor and adds further value to the method.

In one embodiment, the carbon that is produced in the hydrogenation unit (the coke) is an activated carbon. Activated carbon is an amorphous form of carbon characterized by high adsorptivity for many gases, vapors and colloidal solids. The internal surface area of the activated carbon exceeds several hundred $m^2$/gram and the density is not greater than about 0.85 $g/cm^3$. Activated carbon has a high value and can be used for air and water purification, waste treatment, removal of mercury (Hg) and $SO_x$ from stack gases and the like. Thus, the hydrogenation process when applied to coal provides a high Btu value gas stream as well as a valuable by-product.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for the conversion of a coal-containing feedstock to a gas product comprising methane, comprising contacting said coal feedstock with a treatment gas comprising at least about 40 weight percent $H_2$ at a reaction temperature of at least about 600° C. for a time sufficient to convert at least about 90 percent of the volatile matter in the coal-containing feedstock to methane and form a purified carbon product wherein said treatment gas is formed by contacting a molten metal comprising iron with steam to form iron oxide.

2. A method as recited in claim 1, wherein said coal feedstock comprises low-grade coal having a sulfur content of at least about 2 weight percent.

3. A method as recited in claim 1, wherein said treatment gas comprises at least about 99 weight percent $H_2$.

4. A method as recited in claim 1, wherein said treatment gas comprises $H_2$ and CO.

5. A method as recited in claim 1, wherein said reaction temperature is from about 700° C. to about 900° C.

6. A method as recited in claim 1, further comprising the step of combusting at least a portion of said methane to generate electricity.

7. A method as recited in claim 1, further comprising the step of combusting at least a portion of said methane in a combined cycle generator to generate electricity.

8. A method as recited in claim 1, further comprising the step of reacting said purified carbon product and at least a portion of said methane in a boiler to generate electricity.

9. A method as recited in claim 1, further comprising the step of diverting at least a portion of said treatment gas and combining said portion with said methane.

10. A method as recited in claim 1, wherein said step of contacting with steam is terminated and the iron oxide is reduced to iron.

* * * * *